United States Patent
Murphey et al.

(10) Patent No.: US 7,895,795 B1
(45) Date of Patent: Mar. 1, 2011

(54) TRIANGULAR ROLLABLE AND COLLAPSIBLE BOOM

(75) Inventors: Thomas W. Murphey, Albuquerque, NM (US); Jeremy Banik, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 573 days.

(21) Appl. No.: 11/876,081

(22) Filed: Oct. 22, 2007

(51) Int. Cl.
E04H 12/18 (2006.01)
(52) U.S. Cl. .......................................... 52/108; 52/121
(58) Field of Classification Search .................. 52/108, 52/111, 114, 121; 242/160.1, 160.4; 244/159.4, 244/159.5, 172.6, 173.3; 343/723, 877; 226/172, 226/173; 212/347–350
See application file for complete search history.

(56) References Cited

U.S. PATENT DOCUMENTS

| | | | | |
|---|---|---|---|---|
| 2,130,993 A * | 9/1938 | Dubiller | .................. | 52/108 |
| 3,016,988 A * | 1/1962 | Browning | .................. | 187/250 |
| 3,213,573 A * | 10/1965 | Bohr et al. | .................. | 52/108 |
| 3,434,254 A * | 3/1969 | Rubin | .................. | 52/108 |
| 3,528,543 A * | 9/1970 | Robinsky | .................. | 428/178 |
| 3,696,568 A * | 10/1972 | Berry | .................. | 52/108 |
| 3,749,133 A * | 7/1973 | Bochory | .................. | 138/119 |
| 3,811,633 A * | 5/1974 | Cummings et al. | .................. | 226/172 |
| 3,862,528 A * | 1/1975 | Meissinger | .................. | 52/108 |
| 4,047,339 A * | 9/1977 | Smith et al. | .................. | 52/108 |
| 4,386,485 A * | 6/1983 | Kramer | .................. | 52/108 |
| 4,651,480 A * | 3/1987 | Kramer | .................. | 52/108 |
| 6,920,722 B2 * | 7/2005 | Brown et al. | .................. | 52/108 |

OTHER PUBLICATIONS

Roybal, et al, "Development of an Elastically Deployable Boom for Tensioned Planar Structures," 48th AIAA Structures, Structural Dynamics, and Materials Conference, 2007-1838, Honolulu, Hawaii, 2007.

* cited by examiner

*Primary Examiner*—Eileen Lillis
*Assistant Examiner*—Elizabeth A Plummer
(74) *Attorney, Agent, or Firm*—Kenneth E. Callahan

(57) ABSTRACT

An elastic space-deployable boom of carbon fiber reinforced plastic or other resilient material having an open substantially triangular cross-section when deployed and stowed with a flattened cross-section about a circular hub.

6 Claims, 6 Drawing Sheets

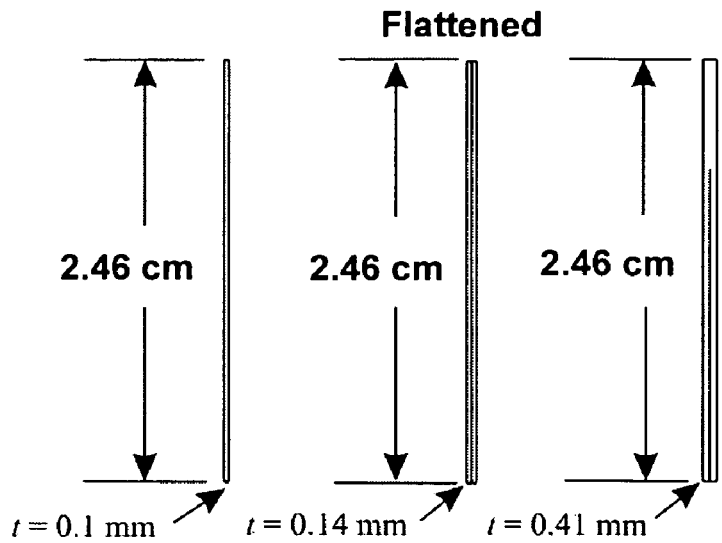
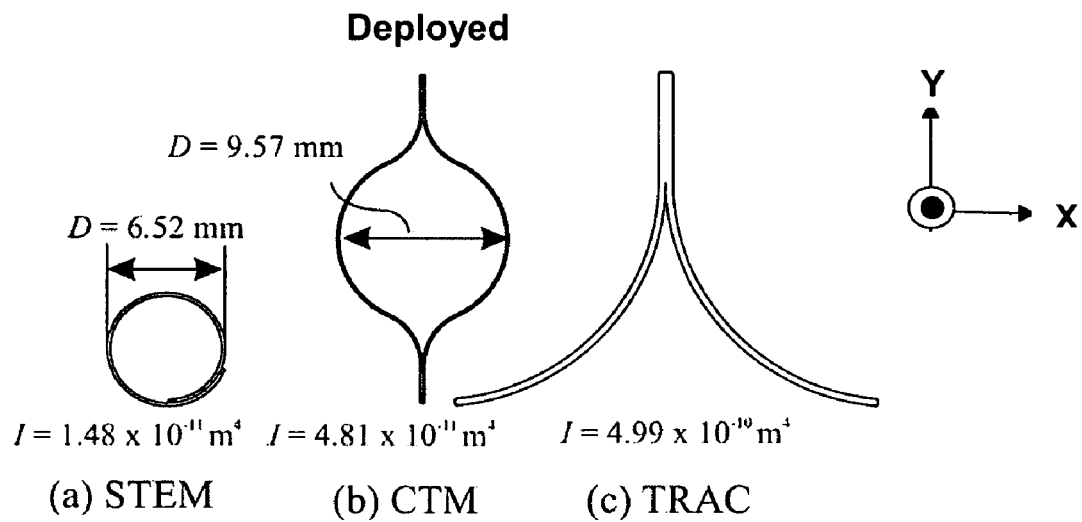
FIG. 3

| Boom Type | H (cm) | t (mm) | D (mm) | $I_y$ ($m^4$) |
|---|---|---|---|---|
| STEM | 2.46 | 0.1 | 6.52 | $1.48 \times 10^{-11}$ |
| CTM | 2.46 | 0.14 | 9.57 | $4.81 \times 10^{-11}$ |
| TRAC | 2.46 | 0.408 | - | $49.9 \times 10^{-11}$ |

| FEM Rigid Node Edge Boundary Conditions | | | |
|---|---|---|---|
| Constraint | X-axis bending | Y-axis bending | Torsion |
| UX | 0 | Free | 0 |
| UY | Free | 0 | 0 |
| UZ | Free | Free | Free |
| RX | Enforced | 0 | 0 |
| RY | 0 | Enforced | 0 |

TRIANGULAR ROLLABLE AND COLLAPSIBLE BOOM

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to spacecraft deployable structures and more particularly to a boom architecture that can be flattened and furled and has a large cross-section inertia.

The subject booms have a deployed configuration where they are used as beam-like structural elements to carry bending and column loads. Boom bending stiffness characterizes this configuration and increases with increasing structural depth (cross section diameter), material thickness and material stiffness. These booms also have a furled (packaged) configuration characterized by roll diameter and height. Prior booms related to the current invention include the Storable Tubular Extendable Member (STEM) shown in FIG. 1A and the lenticular boom, which is sometimes referred to as the Collapsible Tubular Mast (CTM) shown in FIG. 1B. These booms can be stowed around a circular hub where they transition from a flattened configuration to a structurally deeper deployed shape. The STEM is composed of a single strip that, in the deployed state, curls to form a circular cross-section. Although this configuration is simple to fabricate and package, it results in a tall packaged height relative to the deployed boom diameter. Additionally, large strains are required to furl the boom. The lenticular boom is made from a pair of symmetric bell shaped halves bonded at the edges. It flattens similar to a STEM, but for the same deployed diameter, has half the packaged height as the STEM and requires less strain to flatten.

One embodiment of the current invention, the Triangular Rollable and Collapsible (TRAC) boom shown in FIG. 1C, achieves greater deployed structural depth and due to its smaller flattening strains, allows thicker materials than previous booms. These features combine to allow the fabrication of a much stiffer deployable boom with shorter packaged height.

SUMMARY OF THE INVENTION

The Triangular Reliable and Collapsible (TRAC) boom is a boom structure composed of a resilient material that is elastically deployable from a flattened configuration stowed around a circular hub to a deployed configuration having an open substantially triangular cross-section formed from two curved flanges attached at their upper portions. This results in a large cross-section inertia to packaged height ratio compared to Storable Tubular Extendable Member (STEM) and Collapsible Tubular Mast (CTM) architectures. While this design somewhat decreases the torsional stiffness of the boom, sufficient torsional stiffness remains such that bending stiffness is the limiting measure of performance for most applications. In addition, the strain required to flatten the flanges of a TRAC boom are smaller than previous booms allowing for thicker flange materials to be used. The combination of thicker materials and a larger deployed cross section results in a boom that has much greater bending stiffness than alternate technologies. Predicted performance of the TRAC boom indicate 10 times greater bending stiffness than a CTM boom with the same packaged height and material and 34 times greater bending stiffness than a STEM boom.

BRIEF DESCRIPTION OF THE DRAWINGS

FIG. 3 shows the flattened and deployed dimensions of the STEM, CTM, and TRAC deployable booms used in the analysis of bending stiffness.

DESCRIPTION OF THE PREFERRED EMBODIMENT

Figure 1:
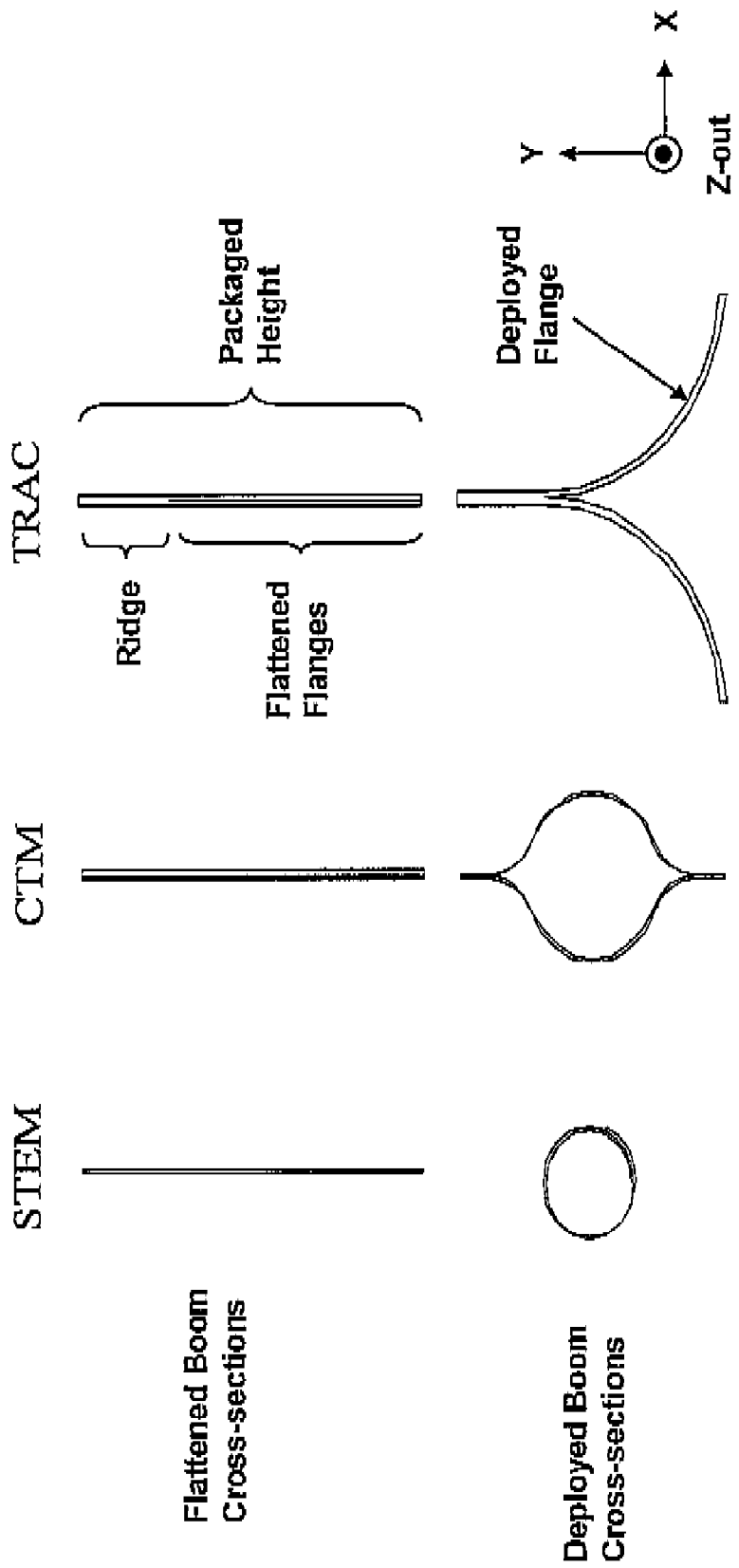
FIG. 1A shows the cross section of a STEM deployable boom.
FIG. 1B shows the cross section of a CTM deployable boom.
FIG. 1C shows the cross section of one version of the TRAC deployable boom.
Figure 2:
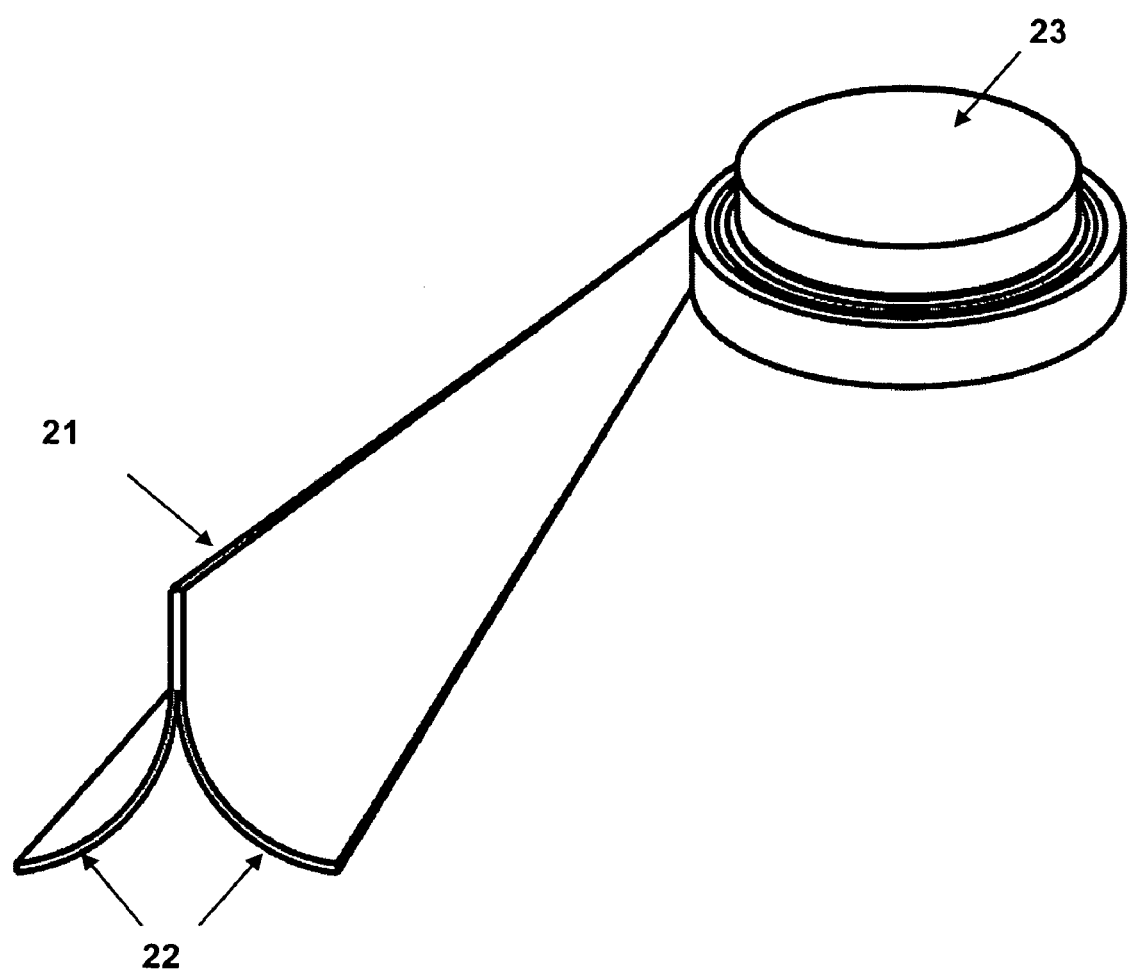
FIG. 2 shows the TRAC boom being deployed from the stowed position.

As seen in the cross-sectional view of FIG. 1C and in FIG. 2, the Triangular Rollable and Collapsible (TRAC) boom consists of a ridge where the upper portion of two curved flanges are attached to one another forming an open substantially triangular cross-section in its deployed configuration. The boom 21 is designed such that in the stowed position its two curved flanges 22 are pinched together allowing it to furl around a circular hub 23 as seen in FIG. 2. The key to achieving the rolling capability is that the flanges are elastically stable in the rolled configuration, e.g., the interior boom flange that is in compression does not bifurcate in the stowed configuration where the curved flanges are forced into a flat configuration. The resilient material employed, the radius of curvature of the flange arc, and the thickness of the flanges determine the strain required to flatten the cross section. A smaller radius of curvature of the flange arcs leads to a stiffer boom, but if too small, the material will crack when pinched flat as it is wrapped around the circular hub. The maximum size of this radius is limited by the need to keep the bending stiffness of the cross section isotropic. A very large radius results in a significantly lower boom lateral bending stiffness. Consequently, a trade off must be made for a given resilient material between the bending stiffness obtained for a given radius of the flange arc versus the requirement of not exceeding the strain limit of the material as it is furled around a circular hub.

Figure 4:
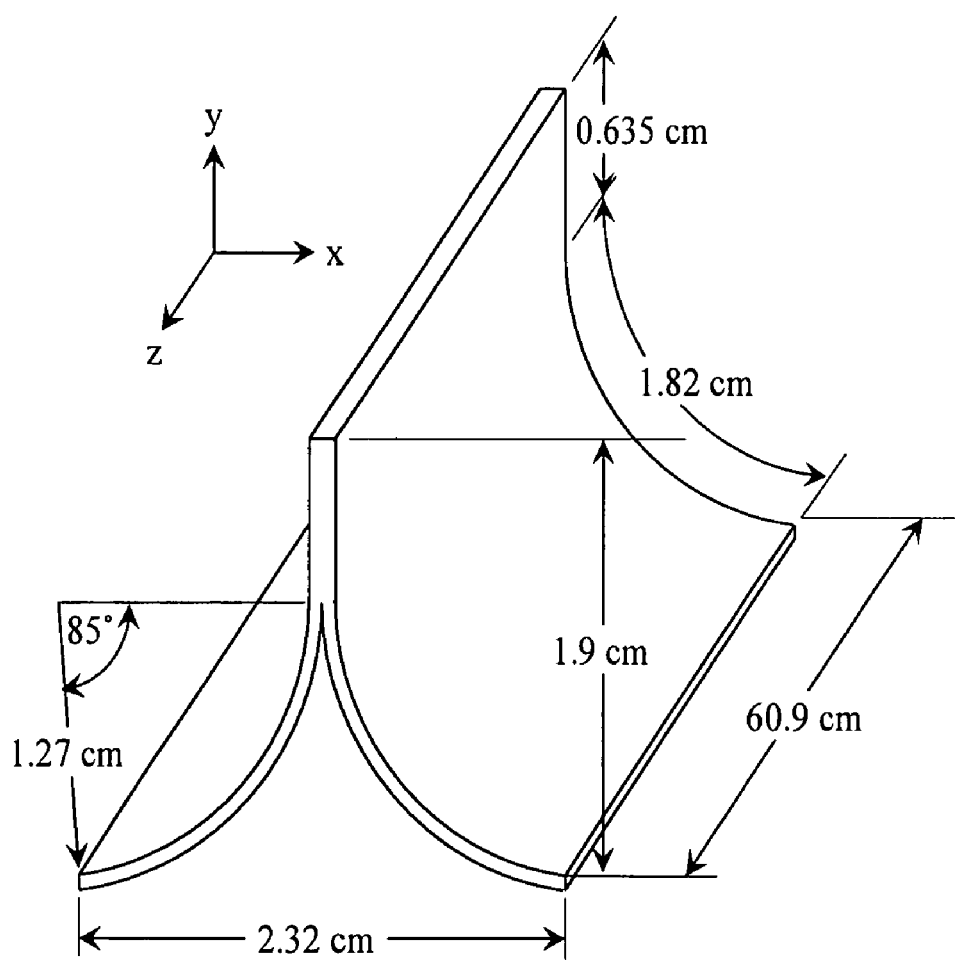
FIG. 4 shows certain dimensions of the baseline design used for the prediction and measurement of TRAC's mechanical properties.
Figures 5, 6A, 6B:
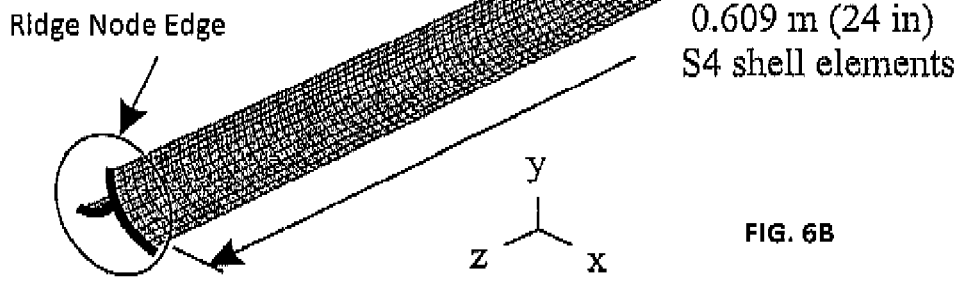
FIG. 5 is a table comparing performance parameters for the three booms.
FIG. 6A is a table of boundary conditions and 6B is a finite element model of the CFRP TRAC.

One objective of the present invention was to develop a boom architecture with a large cross-section inertia to packaged height ratio compared to the STEM and CTM architectures FIGS. 1A and 1B. The baseline design for a particular resilient material, carbon fiber reinforced plastic (CFRP), is discussed in detail below as well as the methods used to determine the best TRAC boom geometry for this material. A finite element analysis was used to predict TRAC's stiffness and buckling strength properties. FIG. 4 shows the dimensions of the baseline design used for the prediction and measurement of TRAC's mechanical properties. Results of boom cross-section inertial calculations for the three boom designs shown in FIG. 3 are given in the FIG. 5 table. As can be seen in the table, the TRAC configuration has ten times more cross-section inertia for the same packaged height than the lenticular configuration (FIG. 3B) and 34 times more than the STEM configuration (FIG. 3A). The same design process detailed here can be used by those skilled in the art to produce TRAC booms for other resilient materials having similar substantially open triangular cross-section designs.

The TRAC boom is designed such that in the stowed position its two flanges are pinched together allowing it to furl around a circular hub (FIG. 2). The key to achieving this capability is that it is elastically stable in the pinched and rolled configuration, e.g., the flanges do not bifurcate while in the rolled configuration. Bifurcation is sensitive to three parameters: the radius at which the boom is rolled, the lateral bending stiffness when pinched, and the symmetry about the horizontal centerline (i.e., all CFRP piles must be continuous from bottom to top). After several iterations of CFRP boom ply orientations, it was determined that the best stacking sequence to balance these effects was [0° tape, 45° weave, 0° tape] for each boom flange (0° is the long axis of the boom). These two laminates overlap at the ridge to form a [0°, ±45°, 0°, 0°, ±45°, 0°] baseline stacking sequence. These relationships only hold for a very specific laminate stacking sequence where all plies must be continuous from top (ridge) to bottom (flange), where each flange laminate is symmetric about the vertical centerline, where the overall laminate is symmetric about the vertical centerline, and where the outermost plies are axial uni-tape piles. Note that these conditions allow the addition of uni-tape piles. For example, an alternate acceptable laminate is [0°, 0°, ±45°, 0°, 0°, 0°, 0°, ±45°, 0°, 0°]. The addition uni-tape piles has the benefit of increasing boom bending and torsion stiffness but at the penalty of a larger boom rolled diameter.

The flange radius of the baseline design shown in FIG. 4 of 1.27 cm was selected to allow flattening (pinching) of the flanges without fiber failure. This geometry is also advantageous because it provides a curved surface to constrain the boom during deployment and furling operations. In general, the means for attaching the two flanges together to form a ridge joint can be any method known to those skilled in the art for the particular resilient flange material chosen as long as the ridge joint is strong enough to endure the shear stresses that are induced during boom wrapping. The portion of the flange height used for the ridge joint would vary with the means used for attaching the two flanges together. For CFRP, a ridge joint fastening the two rectangular flanges of the baseline design together should occupy approximately the top quarter of the flange height and the bottom three-quarters of the flange height should curve outward from the ridge with a radius of curvature R of approximately half of the flange height. This may be done during the initial fabrication process when the boom is cured. This ridge joint is formed once and is permanent.

A finite element model (FEM) of a 0.610 meter long boom was created using ABAQUS, a commercial finite element analysis program, and is shown in FIG. 6 along with the boundary conditions. The nodes at the fixed end of the boom were fully constrained (encastre). The nodes at the free end were tied together (translations and rotations) to form a rigid cross-section. Enforced rotations were incrementally increased on a reference point coupled to the rigid cross-section to determine the boom's stiffness and strength properties.

The FEM was first used in a linear analysis design trade to optimize the boom's bending stiffness. From the enforced rotations, a resisting moment was calculated by the FEM solver and used to determine bending stiffness by the relation, $$EI = ML/\theta.$$

Where E is Young's Modulus of the boom material, I is the cross-section moment of inertia, M is the bending moment applied to the boom, L is the length of the boom test article, and $\theta$ is the boom angular rotation.

Figure 7:
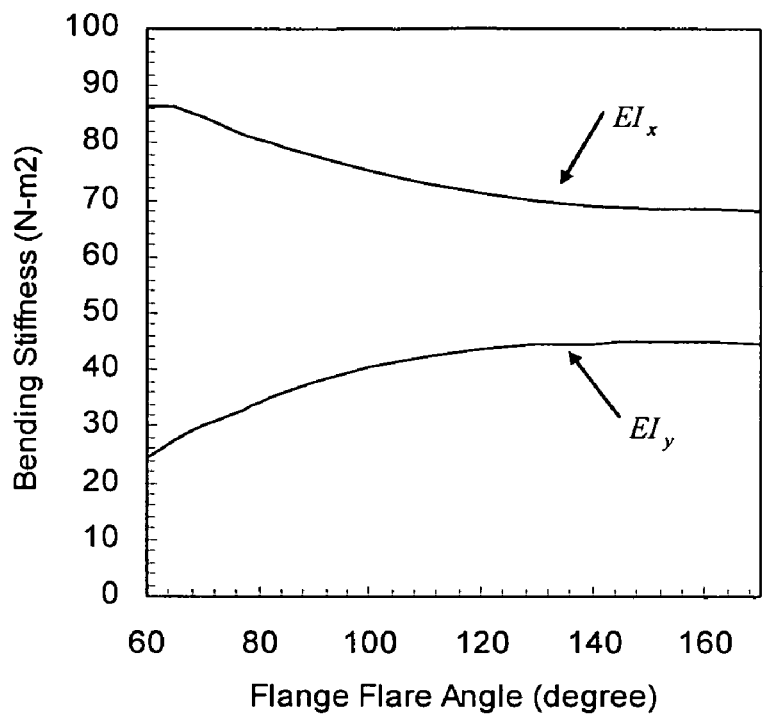
FIG. 7 is a plot of the bending stiffness vs. the flange flare angle in degrees.
Figure 8:
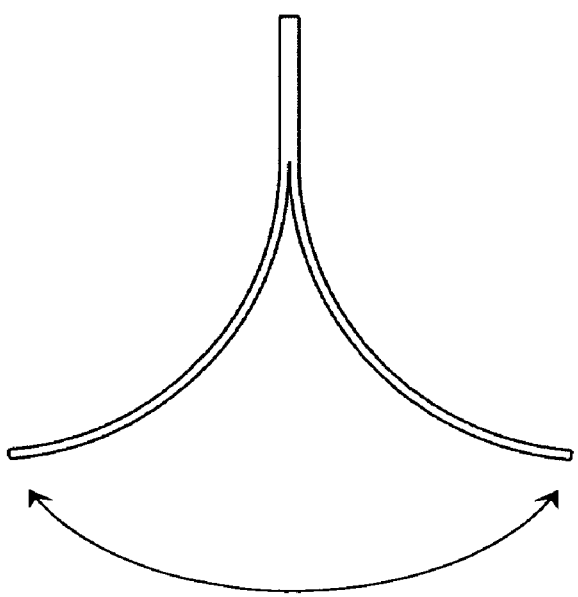
FIG. 8 is a cross-section of the TRAC design showing the optimum flange flare angle for the baseline design.

The flange flare angle was selected based on a design trade that tracked bending stiffness as a function of flange flare angle. Minimizing the radius of curvature maximizes the amount of flange material moved away from the neutral axis for a given flare angle. This in turn maximizes the lateral bending stiffness for the open substantially triangular cross section design. The model was iterated between flare angles of 60° to 170° and determined EI in both x and y directions as defined in FIG. 4. Results of the design trade are shown in the plot of FIG. 7. The bending stiffnesses in the x and y directions do not converge, they plateau as flange flare angle is increased. To maximize the bending stiffness of the deployed cross-section while meeting the package height requirement, a flange flare angle of 170° was selected as seen in FIG. 8.

Testing was done to compare the CFRP TRAC boom design's x and y-axis bending stiffnesses to the FEM predictions. The test results were close to predictions. The boom exhibited no sign of buckling or laminate damage during loading and unloading. Further details of the test results can be found in, Roybal, F. A. Banik, J. A. and Murphey, T. W., "Development of an Elastically Deployable Boom for Tensioned Planar Structures" 48th AIAA/ASME/ASCE/AHS/ASC Structures, Structural Dynamics, and Materials Conf., 23-26 Apr., 2007, AIAA 2007-1838 that is hereby incorporated by reference.

Other resilient materials may be used for TRAC, such as beryllium copper, stainless steel, glass reinforced plastic, or Kevlar reinforced plastic. The thickness of the material, the radius of curvature R of the flanges, the ridge height, and method of attachment would be determined using a similar analysis to that detailed above for CFRP. The flange radius, for example, should be selected so as to be the minimum radius to which the selected material can withstand the act of flattening the boom cross-section during stowage around a circular hub.

The invention claimed is:

1. A boom structure of a resilient material that is elastically deployable from a flattened configuration stowed around a circular hub to a deployed configuration approximately forming an open substantially triangular cross-section, said boom structure comprising:

a. a circular hub;
  b. first and second rectangular flanges each having a similar shorter dimension or height, a longer dimension or length, and a width dimension or thickness, wherein each flange has an outer and inner face;
  c. means for permanently attaching together said flanges along a first end of their heights for their entire lengths along the inner faces to form a ridge joint, said ridge joint being of approximately one quarter of said flange height of the inner faces, wherein the ridge joint can endure any shear stresses induced by being put into said flattened configuration;

d. an arc portion of each flange immediately below said ridge joint having a radius of curvature R, said radius of curvature being approximately the smallest radius that said flanges can have and still be flatted without buckling and without material damage while being stowed around said circular hub, wherein when the boom structure is in the deployed configuration the first flange is separated from the second flange by a desired angle at the height end opposite said ridge joint and when in the flattened configuration the inner faces of the rectangular flanges are abutting.

2. The boom structure of claim 1, wherein the flange material is comprised of carbon fiber reinforced plastic in unidirectional tape and plain weave fabric forms.

3. The boom structure of claim 2, wherein said carbon fiber reinforced plastic material of each flange is comprised of a laminate stacking sequence with an approximate 45 degree plain weave sandwiched between unidirectional tape for each boom flange, the unidirectional tape being aligned with the length of the boom, and the laminates of each flange overlapping at the ridge to thereby form a balanced and symmetric stacking sequence able to wrapped around a circular hub having a diameter of 20 to 28 centimeters.

4. The boom structure of claim 1, wherein said first flange is separated from the second flange by 120 to 170 degrees at the height end opposite said ridge.

5. The boom structure of claim 1, wherein said first flange is separated from the second flange by approximately 170 degrees at the height end opposite said ridge.

6. The boom structure of claim 1, wherein the flange material is comprised of beryllium copper, stainless steel, glass reinforced plastic, or Kevlar reinforced plastic.

* * * * *